United States Patent
Nicotera et al.

(10) Patent No.: US 11,657,292 B1
(45) Date of Patent: May 23, 2023

(54) SYSTEMS AND METHODS FOR MACHINE LEARNING DATASET GENERATION

(71) Applicant: ARCHITECTURE TECHNOLOGY CORPORATION, Eden Prairie, MN (US)

(72) Inventors: Paul Nicotera, Eden Prairie, MN (US); Mandeep Singh, Eden Prairie, MN (US)

(73) Assignee: ARCHITECTURE TECHNOLOGY CORPORATION, Eden Prairie, MN (US)

( * ) Notice: Subject to any disclaimer, the term of this patent is extended or adjusted under 35 U.S.C. 154(b) by 527 days.

(21) Appl. No.: 16/743,977

(22) Filed: Jan. 15, 2020

(51) Int. Cl.
*G06N 3/08* (2023.01)
*G06N 3/04* (2023.01)
*G06N 3/088* (2023.01)

(52) U.S. Cl.
CPC .......... *G06N 3/088* (2013.01); *G06N 3/0454* (2013.01)

(58) Field of Classification Search
None
See application file for complete search history.

(56) References Cited

U.S. PATENT DOCUMENTS

| | | | |
|---|---|---|---|
| 10,460,235 B1 * | 10/2019 | Truong | G06F 16/283 |
| 2019/0244138 A1 * | 8/2019 | Bhowmick | H04L 67/10 |
| 2020/0012584 A1 * | 1/2020 | Walters | G06F 40/166 |
| 2021/0201003 A1 * | 7/2021 | Banerjee | G06K 9/6256 |

OTHER PUBLICATIONS

Paul Nicotera, "Bootstrap", A19-028 Machine Learning Data Auto Generator (ML-DAG), Phase 1 SBIR Proposal.
Nicotera, Paul, "Bootstrap", A19-028 "Machine Learning Data Auto Generator (ML-DAG)", Feb. 6, 2019, 24 pages.

* cited by examiner

*Primary Examiner* — Harry S Hong
(74) *Attorney, Agent, or Firm* — Foley & Lardner LLP (57) ABSTRACT

Disclosed herein are embodiments of systems, methods, and products comprising an analytic server that automates training dataset generation for different application areas. The server may perform an automated, iterative refinement process to build a collection of dataset generator models over time. The server may receive a set of seed examples in a domain and generate candidate examples based on the features of the seed examples using data synthesis techniques. The server may execute a pre-trained label discriminator (LD) and domain discriminator (D2) on the candidate examples. The LD may identify and reject mislabeled data. The D2 may identify and reject out of domain data. The analytic server may regenerate new labeled data based on the feedback of the LD and D2. The analytic server may train a dataset generator by iteratively performing these steps for refinement until the regenerated candidate examples reach a pass rate threshold.

20 Claims, 4 Drawing Sheets

SYSTEMS AND METHODS FOR MACHINE LEARNING DATASET GENERATION

TECHNICAL FIELD

This application relates generally to methods and systems for machine learning dataset generation.

BACKGROUND

Many applications may perform data-rich, time-sensitive analytical workflows that require significant quantities of labeled training data. In many cases, the necessary datasets may not be readily available. Thus, there is a rapidly growing need for large, accurately labeled datasets to enable understanding and utilizing vast amounts of unlabeled and unorganized data in government and commercial applications. The quantity of examples that constitute a large dataset is also growing, with some applications requiring several million examples or more, such as for training datasets in supervised machine learning workflows. Furthermore, the types of labels that are required may vary depending on the application. For example, a deep learning model that is being trained to recognize people in social media may require labels of faces in photos and videos, whereas another model learning to identify activities in social media may require labels of activities describing what people are doing.

Conventional methods for generating training datasets and labeling datasets may have a set of shortcomings. For example, conventional methods may require significant human effort to manually label numerous representative examples (e.g., apply class labels or annotations). However, it may be difficult to invest sufficient skilled labor to produce large training datasets using this method alone. One strategy may be to distribute the labeling work between many people in a crowd-sourcing way. However, these efforts may lead to other problems, such as inconsistent labeling due to personal biases. Furthermore, it may not be feasible to label proprietary or sensitive data using crowd-sourcing.

Conventional methods for automated dataset labeling may predominantly involve generative modeling approaches, such as computer-generated imagery (CGI), data programming, and generative adversarial networks (GANs). CGI technologies may be able to produce photorealistic, high definition full-motion video (FMV) sequences of fictional landscapes, objects, and even people. However, these CGI workflows may require tremendous computing power and significant skilled labor to generate even small datasets of photorealistic imagery or video. This is because specialized, manual techniques are currently needed to make as-generated computer graphics appear real, and such skills are not widely generalizable. Furthermore, CGI may not directly address generation of textual datasets, audio datasets, and other structured and unstructured information types.

Current data programming methods may apply statistical methods to combine noisy labeling functions to produce large datasets with more accurate labels than those of the individual functions. However, the maximum accuracy that can be achieved is generally established by the available labeling functions, and there is no straightforward, widely applicable approach to refine the dataset or the model trained using these labels.

The conventional GANs may be able to mimic real data. For example, GANs may create original paintings and compose original music in the styles of famous artists and generate photo-realistic images of lifelike, fictional faces. The examples generated by such models may have one assigned label, such as a certain artist or body part. However, it may require significant effort to apply other types of labels to the generated datasets, especially those that were not part of the training data selection process. Thus, another large training dataset must be procured and a new model must be trained for each desired label for applications using GANs.

Conventional methods may include conditional GANs (CGANs) to enable generating examples with multiple different labels using a single model. However, as with GANs, CGANs may require a supervised learning process with large, labeled training datasets. Such labeled datasets may not be readily available for many applications of interest, which may largely defeat the purposed of automating dataset generation.

SUMMARY

What is therefore desired is to have a system that provides an automated method to generate useful, labeled training datasets based on user settings and seed examples. What is further desired is a system that can be easily adapted for each organization's analytical workflows and provide high quality datasets and directly reduce users' cognitive burden. Embodiments disclosed herein describe an automated training dataset generation tool that can quickly synthesize a large, labeled training dataset of images and video frames based on a handful of manually labeled examples, so that a user can employ the large training datasets generated by the system to evaluate a variety of machine learning algorithms.

Embodiments disclosed herein describe a software solution that automates training dataset generation for multiple types of information and application areas. Furthermore, the embodiments disclosed herein may significantly reduce the amount of provided training data and user effort required to develop dataset generators for new data and label types. Specifically, an analytic server may perform an automated, iterative refinement process that uses pre-trained discriminator models to incrementally improve domain-specific generative models, called dataset generators, until the dataset generators learn to reproduce representative, labeled datasets. The analytic server may train the dataset generator models using automated, unsupervised or weakly supervised learning techniques applied to a small set of provided seed examples and any available unlabeled datasets for a given domain. The analytic server may build dataset generator models for a wide range of domains, where a domain may be a certain combination of data type and label type.

Embodiments disclosed herein may be applicable to all the big data processing applications that suffer from insufficient training data, including information operations across military, government, and commercial organizations.

In one embodiment, a computer-implemented method comprises receiving, by a server, a set of seed examples in a domain comprising a limited number of datasets of a same data type; generating, by the server, candidate labeled datasets according to features of the set of seed examples; training, by the server, a dataset generator in the domain by iteratively: executing, by the server, a label discriminator that identifies and rejects mislabeled datasets included in the candidate labeled datasets; executing, by the server, a domain discriminator that identifies and rejects datasets that are out of the domain from the candidate labeled datasets; regenerating, by the server, new candidate labeled datasets based on results of the label discriminator and the domain discriminator, wherein the server iteratively executes the label discriminator and the domain discriminator and regenerates the new candidate labeled datasets until attaining a pass rate of each of the label discriminator and the domain discriminator satisfying a threshold; and storing, by the server, the trained dataset generator and the corresponding domain into a database.

In another embodiment, a computer system comprises an electronic device, a server in communication with the electronic device and configured to: receive, from the electronic device, a set of seed examples in a domain comprising a limited number of datasets of a same data type; generate candidate labeled datasets according to features of the set of seed examples; train a dataset generator in the domain by iteratively: executing a label discriminator that identifies and rejects mislabeled datasets included in the candidate labeled datasets; executing a domain discriminator that identifies and rejects datasets that are out of the domain from the candidate labeled datasets; regenerating new candidate labeled datasets based on results of the label discriminator and the domain discriminator, wherein the server iteratively executes the label discriminator and the domain discriminator and regenerates the new candidate labeled datasets until attaining a pass rate of each of the label discriminator and the domain discriminator satisfying a threshold; and store the trained dataset generator and the corresponding domain into a database.

It is to be understood that both the foregoing general description and the following detailed description are exemplary and explanatory and are intended to provide further explanation of the disclosed embodiment and subject matter as claimed.

BRIEF DESCRIPTION OF THE DRAWINGS

The accompanying drawings constitute a part of this specification and illustrate embodiments of the subject matter disclosed herein.

DETAILED DESCRIPTION

Reference will now be made to the illustrative embodiments illustrated in the drawings, and specific language will be used here to describe the same. It will nevertheless be understood that no limitation of the scope of the claims or this disclosure is thereby intended. Alterations and further modifications of the inventive features illustrated herein, and additional applications of the principles of the subject matter illustrated herein, which would occur to one ordinarily skilled in the relevant art and having possession of this disclosure, are to be considered within the scope of the subject matter disclosed herein. The present disclosure is here described in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here.

Embodiments disclosed herein provide auto-generation and enhancement of training datasets, incorporating machine learning and artificial intelligence, to support the development of machine learning techniques and evaluation of existing analytics in a big data environment. Specifically, an analytic server may perform an automated, iterative refinement process to build a collection of dataset generator models over time.

The analytic server may receive a set of seed examples in a certain domain. The analytic server may generate new labeled data using data synthesis techniques based on the set of seed examples. The analytic server may execute a pre-trained label discriminator (LD) and domain discriminator (D2) on the new labeled data. The LD may identify and reject mislabeled data. The D2 may identify and reject out of domain data. The analytic server may regenerate new labeled data based on the feedback of the LD and D2. The regenerated labeled data may further go through the LD and D2. The analytic server may iteratively perform these steps for refinement until the regenerated labeled data reaches a pass rate threshold of each of the LD and D2. As a result, the analytic server may train a dataset generator in a specific domain by iteratively generating refined data based on the feedback of the LD and D2. The analytic server may train dataset generators in different domains. The LD and D2 models may ensure that the dataset generators produce realistic and accurately labeled datasets.

The analytic server may also generate intuitive user interfaces that enable analysts/users across an organization to search for and use dataset generators to easily produce useful training datasets. The dataset generators may produce datasets for many different information domains, including specialized applications, such as drone video or satellite imagery with labels for specific objects.

Figure 1A:
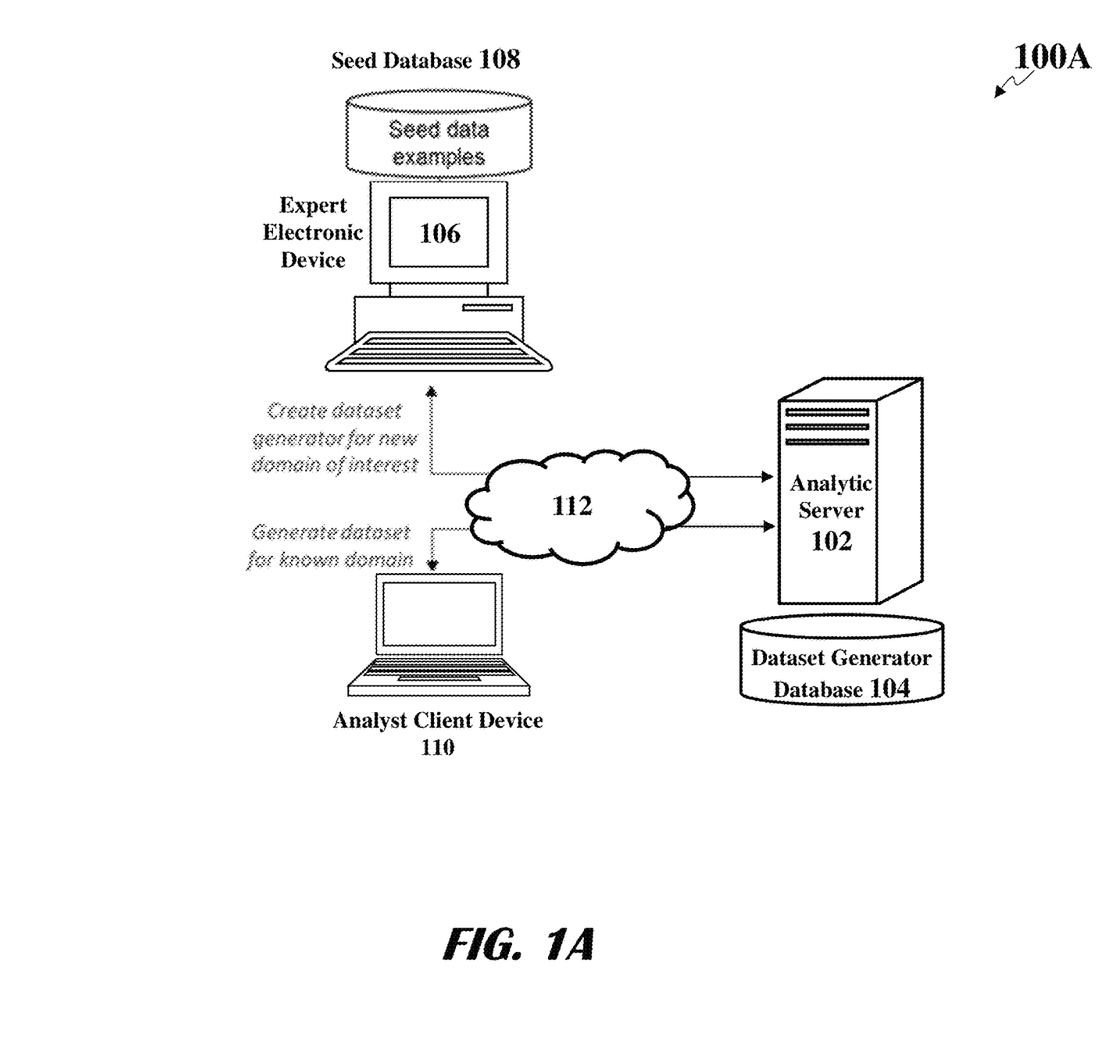
FIG. 1A illustrates a computer system for machine learning dataset generation, according to an embodiment.

FIG. 1A illustrates components of a system 100A for machine learning dataset generation, according to an embodiment. The system 100A may include an analytic server 102 associated with a database of dataset generators 104, an expert electronic device 106 associated with a seed database 108, and one or more analyst client device 110, that are connected with each other via hardware and software components of one or more networks 112. Examples of the network 112 include, but are not limited to, Local Area Network (LAN), Wireless Local Area Network (WLAN), Metropolitan Area Network (MAN), Wide Area Network (WAN), and the Internet. The communication over the network 112 may be performed in accordance with various communication protocols, such as Transmission Control Protocol and Internet Protocol (TCP/IP), User Datagram Protocol (UDP), and IEEE communication protocols.

The analytic server 102 may be any computing device comprising a processor and other computing hardware and software components. The analytic server 102 may be logically and physically organized within the same or different devices or structures, and may be distributed across any number of physical structures and locations (e.g., cabinets, rooms, buildings, cities).

The analytic server 102 may be a computing device comprising a processing unit. The processing unit may include a processor with computer-readable medium, such as a random access memory coupled to the processor. The analytic server 102 may be running algorithms or computer executable program instructions, which may be executed by a single processor or multiple processors in a distributed configuration. The analytic server 102 may be configured to interact with one or more software modules of a same or a different type operating within the system 100A.

Non-limiting examples of the processor may include a microprocessor, an application specific integrated circuit, and a field programmable object array, among others. Non-limiting examples of the analytic server 102 may include a server computer, a workstation computer, a tablet device, and a mobile device (e.g., smartphone). Some embodiments may include multiple computing devices functioning as the analytic server 102. Some other embodiments may include a single computing device capable of performing the various tasks described herein.

The analytic server 102 may receive a set of seed examples from the expert electronic device 106. The seed examples may be a small set of labeled datasets for a given domain. For example, subject matter experts may provide the set of seed examples that are correctly labeled and fall into a same domain. The domain may be a certain combination of data type and label type. Example domains may include: unmanned aircraft system (UAS) based photographs of urban areas with labeled vehicles; electro optical satellite imagery of bodies of water with ships labeled; aircraft-captured video streams of forests with fire movements labeled; security camera footage with descriptions of different kinds of suspicious activity; documents with portion marking of sensitive and classified information; and others.

Based on the provided seed examples, the analytic server 102 may train a dataset generator in that domain. The dataset generator may be able to generate more labeled datasets that are in the same domain. Specifically, the analytic server 102 may learn the features of the seed examples and use a data synthesis technique to create new candidate examples/datasets with the same or similar features. The analytic server 102 may also use a label discriminator to reject mislabeled examples included in the candidate examples. Furthermore, the analytic server 102 may use a domain discriminator to reject unrepresentative examples that are not in the same domain of the seed examples. Based on the results of the label discriminator and the domain discriminator, the analytic server 102 may generate refined candidate examples/datasets, which may further go through the label discriminator and the domain discriminator. The analytic server 102 may iteratively perform these steps until the generated candidate examples are of good quality. For example, the candidate examples reach a specific pass rate (e.g., a pass rate threshold) of each of the label discriminator and the domain discriminator.

The expert electronic device 106 may be any computing device allowing a subject matter expert to interact with the analytic server 102. The expert electronic device 106 may be any computing device comprising a processor and non-transitory machine-readable storage medium. The examples of the computing device may include, but are not limited to, a personal digital assistant (PDA), a smartphone, a tablet computer, and the like. The expert electronic device 106 may comprise any number of input and output devices supporting various types of data, such as text, image, audio, video, and the like. The subject matter expert operating the expert electronic device 106 may provide a set of seed examples in different domains. For example, for each domain, subject matter experts may provide the set of seed examples that are correctly labeled and fall into the same domain.

The seed database 108 may be any non-transitory machine-readable media configured to store the seed examples in each domain. The seed database 108 may be part of the expert electronic device 106. Alternatively, the seed database 108 may be a separate component in communication with the expert electronic device 106.

The analytic server 102 may receive a request from the analyst client device 110 (or the expert electronic device 106) to generate datasets in a domain of interest. If the domain of interest is a known domain, the analytic server 102 may have trained a dataset generator in that domain based on the seed examples provided by the subject matter experts. The analytic server 102 may use the trained dataset generator to generate datasets and transmit the generated datasets to the analyst client device 110. If the requested domain is a new domain, the analytic server 102 may request the subject matter experts (operating the expert electronic device 106) to provide seed examples in that new domain. The analytic server 102 may train a new dataset generator in the new domain based on the seed examples. Based on the seed examples in different domains, the analytic server 102 may build a library of dataset generators. Each dataset generator may generate datasets for a given domain.

The trained dataset generator may be a reusable generative model capable of automatically creating an arbitrary number of new labeled datasets that are representative of the seed examples. The analytic server 102 may store the trained dataset generators into the database of dataset generators 104 for use in an organization's analytical workflows. The analytic server 102 may generate a graphical user interface (GUI) to provide an intuitive graphical environment that enables users/data analysts to easily search for relevant generators and automatically create new training datasets for their workflows. The GUI may also enable users to train dataset generators for new data and label types as the organization's operations evolve.

The analyst client device 110 may be any computing device allowing a user/data analyst to interact with the analytic server 102. The analyst client device 110 may be any computing device comprising a processor and non-transitory machine-readable storage medium. The examples of the computing device may include, but are not limited to, a desktop computer, a laptop, a personal digital assistant (PDA), a smartphone, a tablet computer, and the like. The analyst client device 110 may comprise any number of input and output devices supporting various types of data, such as text, image, audio, video, and the like. An analyst/user operating the analyst client device 110 may issue an electronic request to the analytic server 102 requesting datasets in a domain of interest.

The database of dataset generators 104 may be any non-transitory machine-readable media configured to store the library of dataset generators trained by the analytic server 102. For example, data in the database of dataset generators 104 may comprise the domain identifier, the seed examples of each domain, the dataset generator of each domain, and the like. The database 104 may include any other related data of the dataset generators. The database of dataset generators 104 may be part of the analytic server 102. Alternatively, the database of dataset generators 104 may be a separate component in communication with the analytic server 102.

Figure 1B:
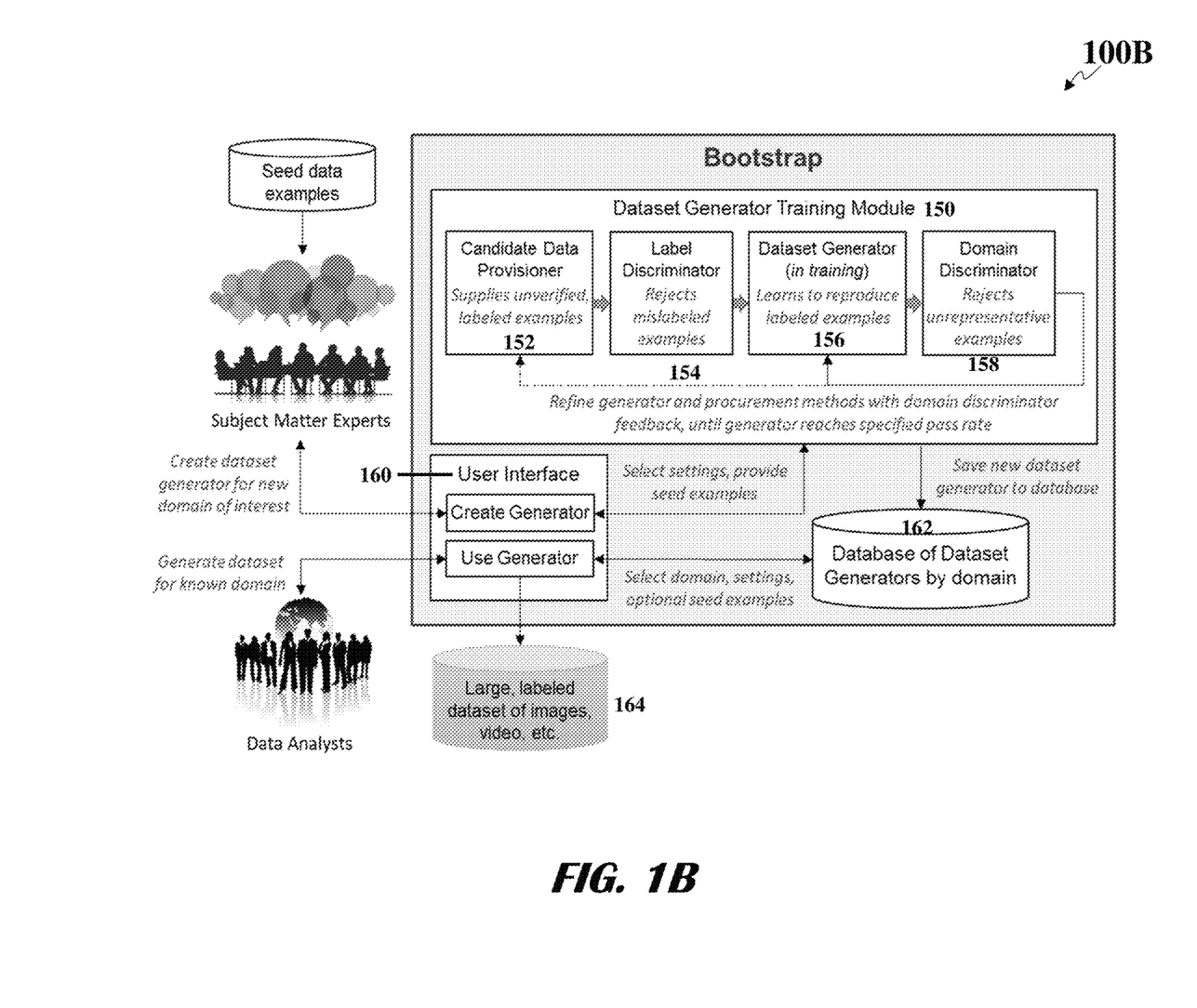
FIG. 1B illustrates components of the dataset generator training module, according to an embodiment.

FIG. 1B illustrates components of the dataset generator training module 100B, according to an embodiment. The analytic server may comprise the dataset generator training module. The module may contain and manage the processes for training a dataset generator model for provided user settings and labeled seed examples. The analytic server may receive seed examples in a new domain from the expert electronic device. The analytic server may receive the seed examples through the user interface 160 for creating generators. The dataset generator training module 150 may use the provided seed examples to train a dataset generator that can generate datasets that are representative of the seed examples. Specifically, the dataset generator training module 150 may comprise a candidate data provisioner 152, a label discriminator (LD) 154, a dataset generator (in training) 156, and a domain discriminator (D2) 158. The candidate examples/datasets generated by the candidate data provisioner 152 may go through the filters of the relevant domain's LD 154 and D2 158 models. The analytic server may use the passing examples to train the dataset generator 156.

The candidate data provisioner 152 may learn key features of the seed examples and use a data programming technique and/or a data synthesis technique to create new candidate examples/datasets according to the key features of the seed examples. The candidate data provisioner 152 may use Snorkel library to intelligently merge different sources of labeled examples/datasets. For example, the candidate data provisioner 152 may combine the relatively small set of high-quality seed examples with large quantities of examples/datasets with noisier labels from different sources. The candidate data provisioner 152 may use unsupervised modeling approaches, such as clustering, as well as transfer learning techniques to apply noisier labels to unlabeled datasets based on the seed examples. Advantageously, the analytic server may not rely solely on statistical methods to infer the nature of label noise in each data source. As a result, the candidate data provisioner 152 may be more tolerant of noisy labels, because the label discriminator 154 and domain discriminator 158 may filter out the mislabeled examples for a given domain. The candidate data provisioner 152 may supply unverified labeled examples (e.g., new candidate examples) to the label discriminator (LD) 154 and the domain discriminator (D2) 158.

The dataset generator training module 150 may include two processes: the learning process for the domain discriminator (D2) 158 and the learning process for the label discriminator (LD) 154. The purpose of the D2 158 learning process may to be train a model that characterizes a representative set of data examples for a particular domain, such as satellite imagery of certain landscapes. A trained D2 model 158 may act as a binary classifier, effectively labeling test examples/datasets as "in domain" or "out of domain" for a given domain. The analytic server may use unsupervised learning techniques to characterize the bounded "in domain" class. The unsupervised learning algorithm may be a deep auto-encoder neural network.

The purpose of the LD 154 learning process may be to train a set of models that characterize a representative set of data examples with a corresponding set of labels. The LD 154 learning process may include k binary classification functions, where k is the number of distinct labels, or it may include one or more multiclass classifiers, such as a k-class classifier. The analytic server may use semi-supervised learning techniques to characterize the bounds of each class label. For example, the analytic server may train a restricted Boltzmann machine (RBM) using unsupervised learning on examples of all classes and train label-specific discriminators for each class using transfer learning to build on the RBM features. The D2 and LD learning processes may use publicly available image object recognition datasets.

The analytic server may use progressive GANs (generative adversarial networks) as learning algorithms, such as style-based generators, to train the dataset generator learning component 156 for images. The progressive GANs refer to a training process that progressively grows the model structures, in addition to tuning model parameters, in response to the adversary model's feedback. The progressive GANs may enable improved quality and stability compared to conventional GANs, because the progressive GANs may provide more mechanisms to match the learning rates of the adversarial models.

Style-based generators may enable significant, meaningful variations in synthesized examples, because style elements extracted from multiple input examples can be merged to generate many more permutations than the number of original examples. Moreover, by representing styles as mappings of input data to intermediate feature space, the style-based generators may learn, sample, and combine styles at all scales of a hierarchical convolutional neural network, from pixel-level textures to image-wide color schemes. The dataset generator learning component 156 may also incorporate stochastic variation methods, such as noising, into the training process to add style diversity that was not present in the original data. The use of these optional techniques may be configurable by the subject matter expert as part of the dataset generator training process.

The dataset generator training module 150 may receive the seed examples, and generate unverified labeled examples/datasets in candidate data provisioner 152 based on the features of the seed examples. The label discriminator 154 may filter the unverified labeled examples and reject mislabeled examples. The dataset generator learning component 156 may learn to reproduce labeled examples based on the feedback of the label discriminator 154. The domain discriminator 158 may further filter the reproduced labeled examples and reject unrepresentative examples included in the reproduced labeled examples. The results of the domain discriminator 158 may go back to the candidate data provisioner 152 for further refinement. The dataset generator training module 150 may iteratively perform these steps until the candidate examples reach a specific pass rate (e.g., a pass rate threshold) of each of the label discriminator 154 and the domain discriminator 158. The iterative refinement process may entail providing sequentially procured batches of training data to the style-based progressive GAN to perform conventional adversarial model training. The analytic server may enable training the dataset generator 156 with significantly less labeled data from the user, because the data provisioner 152, LD 154, and D2 158 components are applied to the seed examples to procure many batches of representative examples/datasets with high quality labels.

For each domain, the dataset generator training module 150 may receive seed examples from the subject matter expert and train the dataset generator that can generate more datasets in the domain. The analytic server may store the dataset generator into the database of dataset generators 162 by domain. The database of dataset generators 162 may include a library of dataset generators in different domains.

The analytic server may receive a request from the user/data analyst to generate datasets in a known domain though the user interface 160 for using generator. The analytic server may retrieve the dataset generator in the requested domain from the database of dataset generators 162. The retrieved dataset generator may generate datasets according to the user settings. The generated datasets may be large labeled datasets of images, videos, and the like. The analytic server may return or provide access to the generated datasets to the user though the user interface 160. In some embodiments, the analytic server may store the generated datasets into a database 164.

The dataset generator training module 150 may integrate seamlessly with existing cloud computing or distributed processing infrastructure by supporting many popular machine learning as a service (MLAS) APIs (application programming interfaces). The dataset generator training module 150 may be a training dataset generation tool that can create additional types of labeled datasets for new information domains, such as imagery or video for specialized applications.

Figure 2:
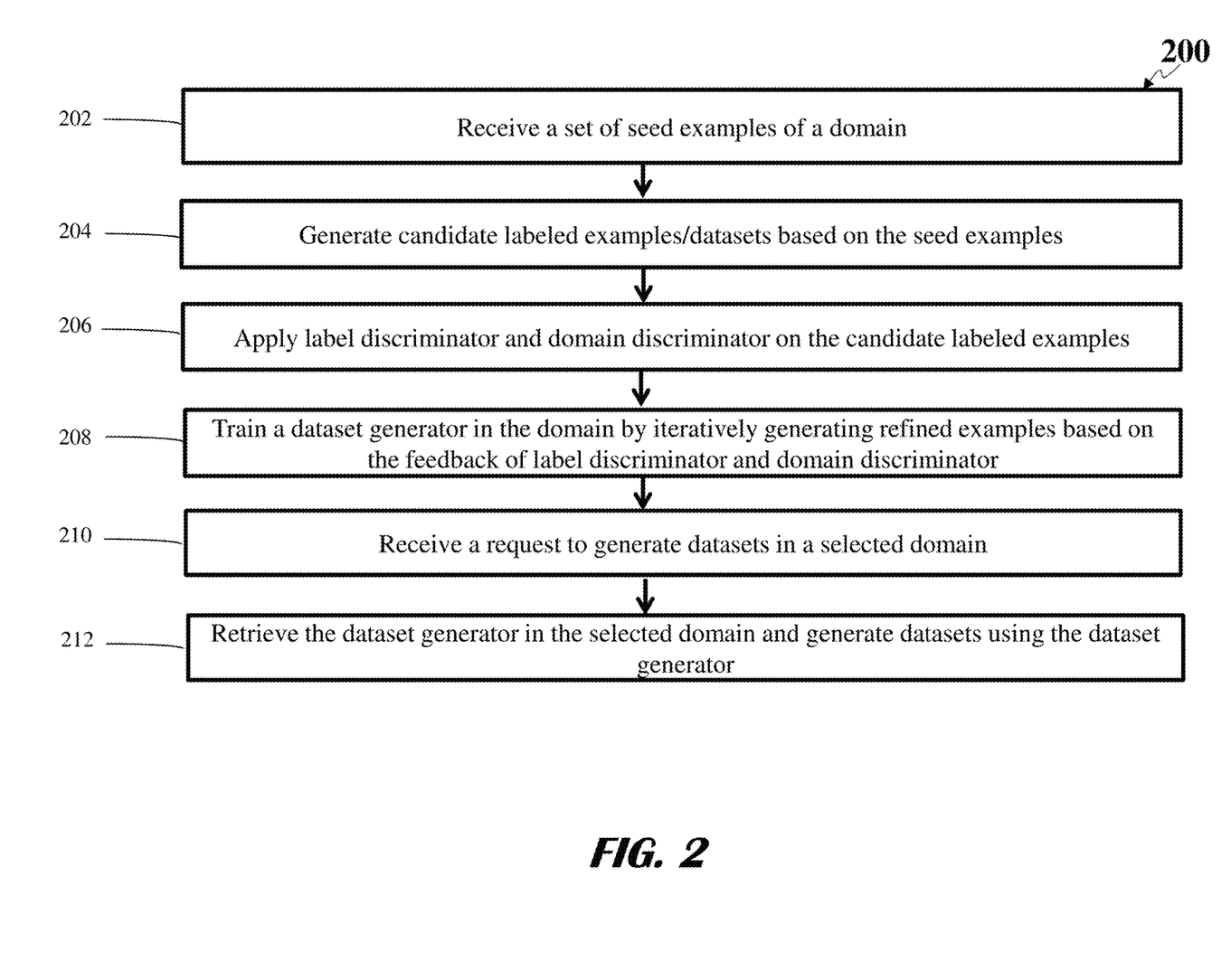
FIG. 2 illustrates a flowchart for machine learning dataset generation, according to an embodiment.

FIG. 2 illustrates a flowchart for machine learning dataset generation, according to an embodiment. Other embodiments may comprise additional or alternative steps, or may omit some steps altogether.

At step 202, the analytic server may receive a set of labeled seed examples of a domain. The labeled seed examples of the domain may comprise a limited number of datasets of the same data type with parts of the seed example contents (e.g., one or more objects) being correctly labeled. For example, a set of seed examples of a domain may be aircraft-captured video streams of forests with fire movements labeled. The analytic server may receive the set of seed examples of a certain domain from the subject matter experts. The analytic server may receive seed examples in different domains. The analytic server may receive seed examples of different types. For example, the analytic server may receive images, videos, documents, and the like.

At step 204, the analytic server may generate candidate labeled examples/datasets based on the set of labeled seed examples. The analytic server may learn and extract the key features of the seed examples using machine learning and/or pattern recognition algorithms. The key features may comprise the labeled objects, and other information and content included in the seed examples. For example, the key features of an image may comprise specific structures in the image, such as points, edges, objects including labeled objects and other objects, motion in image sequences, shapes defined in terms of curves or boundaries between different image regions, properties of such a region, and any other information.

The analytic server may use a data programming technique and/or a data synthesis technique to create new candidate labeled examples/datasets according to the key features of the seed examples. Specifically, the analytic server may intelligently merge different sources of labeled examples to generate the candidate examples. For example, the analytic server may combine the relatively small set of high-quality seed examples with large quantities of examples with noisier labels. The analytic server may use unsupervised modeling approaches, such as clustering, as well as transfer learning techniques to apply tentative labels to unlabeled datasets based on the seed examples.

In some embodiments, the analytic server may generate the candidate labeled examples/datasets without requiring the seed examples from the subject matter experts. For example, the analytic server may accumulate domain coverage over time. The analytic server may have related dataset generators available from previous development. Such dataset generators may provide sufficient data provisioning tools to enable a new dataset generator to be trained.

At step 206, the analytic server may apply label discriminator and domain discriminator on the candidate labeled examples/datasets. Because the candidate labeled examples are unverified and may include noise, the analytic server may apply the label discriminator and the domain discriminator to the candidate labeled examples/datasets to filter out mislabeled candidate examples/datasets in a given domain.

Specifically, the label discriminator may be a set of models that characterize a representative set of data examples with a corresponding set of labels. The label discriminator may be k binary classification functions or a k-class classifier, where k is the number of distinct labels. The analytic server may use semi-supervised learning techniques to characterize the bounds of each class label. For example, the analytic server may train a restricted Boltzmann machine (RBM) using unsupervised learning on examples of all classes and train label-specific discriminators for each class using transfer learning to build on the RBM features. The label discriminator may identify and reject mislabeled examples included in the candidate labeled examples.

The domain discriminator may be a model that characterizes a representative set of data examples for a particular domain, such as satellite imagery of certain landscapes. The trained domain discriminator may act as a binary classifier, effectively labeling the candidate examples as "in domain" or "out of domain" for a given domain. The analytic server may use unsupervised learning techniques to characterize the bounded "in domain" class. The unsupervised learning algorithm may be a deep auto-encoder neural network. The domain discriminator may identify and reject unrepresentative examples that are not in the same domain as the seed examples.

By executing the label discriminator and the domain discriminator, the analytic server may be able to identify and exclude the candidate examples that are mislabeled and out of the domain.

At step 208, the analytic server may train a dataset generator in the domain by iteratively generating refined examples/datasets based on the feedback of label discriminator and domain discriminator. The dataset generator may be a model that iteratively learns from the feedback of the label discriminator and the domain discriminator and reproduces labeled examples based on the feedback. The reproduced labeled examples may further go through the label discriminator and the domain discriminator. The analytic server may iteratively execute the label discriminator and the domain discriminator and regenerate the new candidate labeled examples until attaining a pass rate of each of the label discriminator and the domain discriminator satisfying a threshold value. For example, the analytic server may iteratively perform these steps for refinement until the candidate examples reach a specific pass rate (e.g., a pass rate threshold) of the label discriminator and the domain discriminator. The threshold for the label discriminator and the threshold for the domain discriminator may be two different values or the same value.

The analytic server may use progressive GANs (generative adversarial networks) learning algorithms, such as style-based generators, to train the dataset generator model for images. The progressive GANs refer to a training process that progressively grows the model structures, in addition to tuning model parameters, in response to the adversary model's (e.g., the label discriminator and the domain discriminator's) feedback. The progressive GANs may enable improved quality and stability compared to conventional GANs, because the progressive GANs may provide more mechanisms to match the learning rates of the adversarial models.

The style-based generators may enable significant, meaningful variations in synthesized examples, because style elements extracted from multiple input examples can be merged to generate many more permutations than the number of original examples. Moreover, by representing styles as mappings of input data to intermediate feature space, the style-based generators may learn, sample, and combine styles at all scales of a hierarchical convolutional neural network, from pixel-level textures to image-wide color schemes. The dataset generator model may also incorporate stochastic variation methods, such as noising, into the training process to add style diversity that was not present in the original data.

Based on the seed examples in different domains, the analytic server may build a library of dataset generators. Each dataset generator may generate datasets for a given domain. The trained dataset generator may be a reusable generative model capable of automatically creating an arbitrary number of new labeled datasets in the corresponding domain. The analytic server may store the trained dataset generators into the database of dataset generators.

Furthermore, the analytic server may generate a graphical user interface (GUI) to provide an intuitive graphical environment that enables users/data analysts to easily search for relevant generators and automatically create new training datasets. The GUI may also enable users to train dataset generators for new data and label types.

At step 210, the analytic server may receive a request to generate datasets in a selected domain. A user (e.g., data analyst) may need significant quantities of labeled datasets to perform analytical workflows. For example, the user may require large, accurately labeled datasets to enable understanding of vast amount of data in various applications. In addition, the types of datasets and labels that are required may vary depending on the application. The user may issue a request to generate datasets in a domain of interest through the GUI provided by the analytic server.

In some embodiments, the analytic server may provide a GUI comprising text-based interface that allows the user to input the request by typing the request in the text-based interface. In some embodiments, the analytic server may provide a GUI comprising a graphical element, such as radio button or dropdown menu, that allows the user to select one or more options provided by the analytic server. The selected option may be a selected domain, parameters, and/or any other attributes of the requested datasets.

At step 212, the analytic server may retrieve the dataset generator in the selected domain and generate datasets using the dataset generator. As discussed above, the trained dataset generators may be domain-specific generative models. Each dataset generator may generate datasets for a given domain. The analytic server may build a library of dataset generators for a wide range of domains and store them into the database of dataset generators.

After receiving the request to generate datasets in the selected domain, the analytic server may retrieve the corresponding dataset generator from the database based on the domain identifier. The trained dataset generator may be a reusable generative model capable of automatically creating an arbitrary number of new labeled datasets in the corresponding domain. The retrieved dataset generator may correspond to the selected domain and may generate more datasets in the selected domain. The analytic server may execute the retrieved dataset generator and generate datasets.

If the requested domain is a new domain with no available dataset generator, the analytic server may request the subject matter experts to provide seed examples in that new domain. In some embodiments, the analytic server may request the user to provide some seed examples in the new domain. The analytic server may train a new dataset generator in the new domain based on the seed examples.

The analytic server may return the generated datasets to the user though a GUI. In some embodiments, the analytic server may further process the generated datasets based on the parameters and attributes included in the request and return the datasets satisfying the parameters and attributes. In addition, the analytic server may provide a GUI to allow the user to search the returned datasets based on one or more parameters and attributes.

Figure 3:
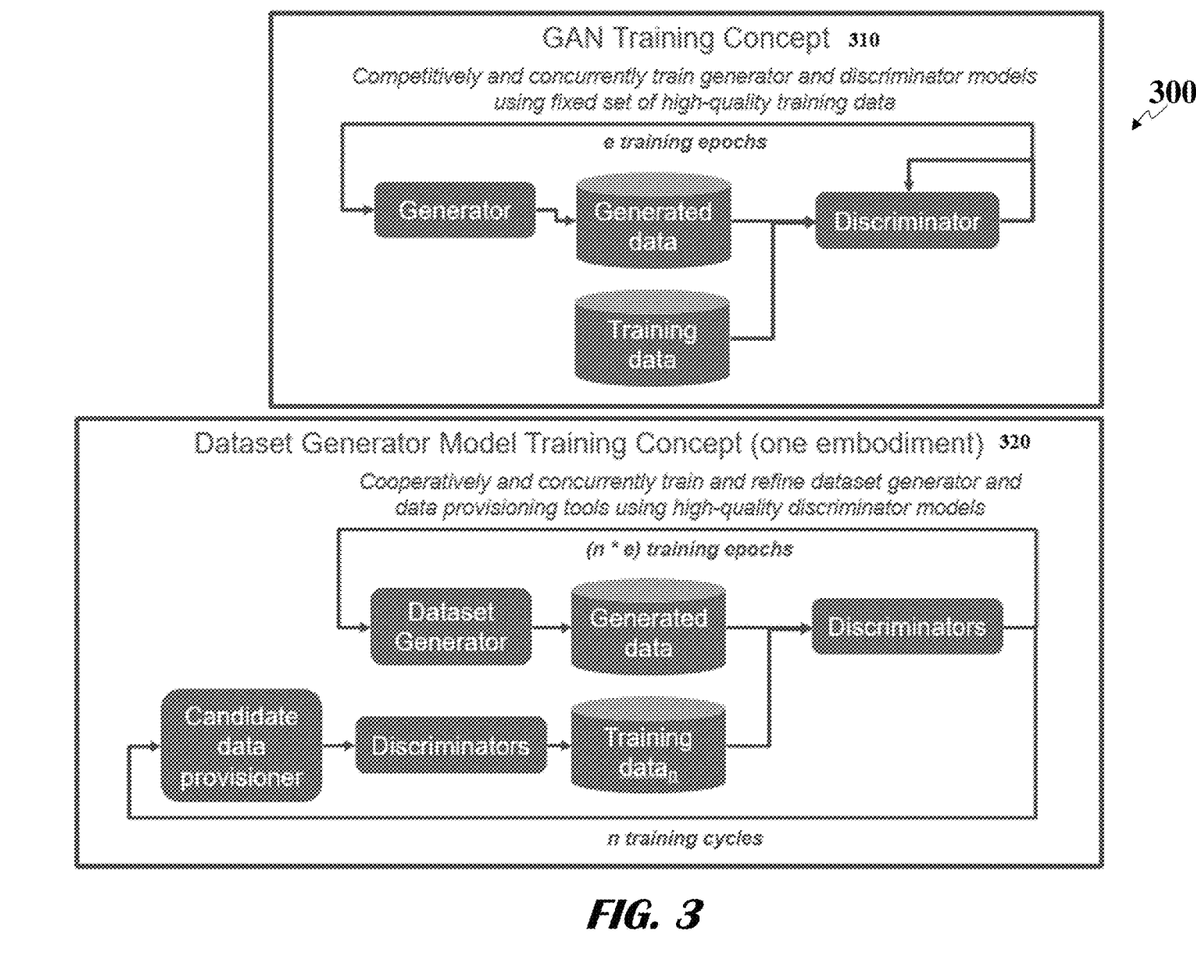
FIG. 3 compares the training process of conventional GAN models and the training process of the dataset generator models described herein, according to an embodiment.

FIG. 3 compares the training process of conventional GAN models and the training process of the dataset generator models described herein 300, according to an embodiment. The diagrams 300 show that the dataset generator model 320 described herein may entail a fundamentally different learning process than the conventional GAN approach 310, which is how the system and method disclosed herein enables training dataset generator models for targeted domains with few or no labeled examples. The conventional GANs 310 typically utilize a fixed, high-quality training dataset to enable training of competing generator and discriminator models. High-quality training datasets are not available for the problems that the embodiments disclosed herein address. Thus, the embodiments disclosed herein may instead use high-quality discriminator models to cooperatively train dataset generator models 320, one of which may be a reusable, efficient representation that can serve as a dataset generator. The diagrams 300 also display how a conventional GAN learning process 310 may be incorporated as part of the process for developing dataset generators 320 disclosed herein. Other embodiments may comprise additional or alternative learning processes, or may omit some steps from those displayed in the figure.

The foregoing method descriptions and the process flow diagrams are provided merely as illustrative examples and are not intended to require or imply that the steps of the various embodiments must be performed in the order presented. The steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, and the like. When a process corresponds to a function, the process termination may correspond to a return of the function to a calling function or a main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of this disclosure or the claims.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the embodiments described herein and variations thereof. Various modifications to these embodiments will be readily apparent to those skilled in the art, and the generic principles defined herein may be applied to other embodiments without departing from the spirit or scope of the subject matter disclosed herein. Thus, the present disclosure is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A computer-implemented method comprising:
    receiving, by a server, a set of seed examples in a domain comprising a limited number of datasets of a same data type;
    generating, by the server, candidate labeled datasets according to features of the set of seed examples;
    training, by the server, a dataset generator in the domain by iteratively:
        executing, by the server, a label discriminator that identifies and rejects mislabeled datasets included in the candidate labeled datasets;
        executing, by the server, a domain discriminator that identifies and rejects datasets that are out of the domain from the candidate labeled datasets;
        regenerating, by the server, new candidate labeled datasets based on results of the label discriminator and the domain discriminator,
            wherein the server iteratively executes the label discriminator and the domain discriminator and regenerates the new candidate labeled datasets until attaining a pass rate of each of the label discriminator and the domain discriminator satisfying a threshold; and
    storing, by the server, the trained dataset generator and the corresponding domain into a database.

2. The method of claim 1, further comprising:
    receiving, by the server, a request to generate datasets in a selected domain through a graphical user interface;
    retrieving, by the server, the dataset generator from the database based on the selected domain; and
    executing, by the server, the retrieved dataset generator to generate datasets in the selected domain.

3. The method of claim 1, further comprising:
    generating, by the server, the candidate labeled datasets using a data programming technique or a data synthesis technique.

4. The method of claim 1, further comprising:
    generating, by the server, the candidate labeled datasets based on combining the limited number of seed examples with large quantities of datasets from different sources.

5. The method of claim 1, further comprising:
    training, by the server, the dataset generator using progressive generative adversarial networks learning algorithms.

6. The method of claim 1, wherein the domain discriminator is a binary classifier based on a deep auto-encoder neural network.

7. The method of claim 1, wherein the domain discriminator is a binary classifier based on unsupervised learning techniques.

8. The method of claim 1, wherein the label discriminator is k binary classification functions or a k-class classifier, where k is the number of distinct labels.

9. The method of claim 1, further comprising:
    extracting, by the server, features of the set of seed examples using machine learning or pattern recognition algorithms.

10. The method of claim 1, wherein the set of seed examples includes objects that are correctly labeled.

11. A computer system comprising:
    an electronic device,
    a server in communication with the electronic device and configured to:
        receive, from the electronic device, a set of seed examples in a domain comprising a limited number of datasets of a same data type;
        generate candidate labeled datasets according to features of the set of seed examples;
        train a dataset generator in the domain by iteratively:
            executing a label discriminator that identifies and rejects mislabeled datasets included in the candidate labeled datasets;

executing a domain discriminator that identifies and rejects datasets that are out of the domain from the candidate labeled datasets;

regenerating new candidate labeled datasets based on results of the label discriminator and the domain discriminator, wherein the server iteratively executes the label discriminator and the domain discriminator and regenerates the new candidate labeled datasets until attaining a pass rate of each of the label discriminator and the domain discriminator satisfying a threshold; and store the trained dataset generator and the corresponding domain into a database.

12. The computer system of claim 11, wherein the server is further configured to:

receive a request to generate datasets in a selected domain through a graphical user interface;

retrieve the dataset generator from the database based on the selected domain; and execute the retrieved dataset generator to generate datasets in the selected domain.

13. The computer system of claim 11, wherein the server is further configured to:

generate the candidate labeled datasets using a data programming technique or a data synthesis technique.

14. The computer system of claim 11, wherein the server is further configured to:

generate the candidate labeled datasets based on combining the limited number of seed examples with large quantities of datasets from different sources.

15. The computer system of claim 11, wherein the server is further configured to:

train the dataset generator using progressive generative adversarial networks learning algorithms.

16. The computer system of claim 11, wherein the domain discriminator is a binary classifier based on a deep autoencoder neural network.

17. The computer system of claim 11, wherein the domain discriminator is a binary classifier based on unsupervised learning techniques.

18. The computer system of claim 11, wherein the label discriminator is k binary classification functions or a k-class classifier, where k is the number of distinct labels.

19. The computer system of claim 11, wherein the server is further configured to:

extract features of the set of seed examples using machine learning or pattern recognition algorithms.

20. The computer system of claim 11, wherein the set of seed examples includes objects that are correctly labeled.

* * * * *